July 21, 1970   J. I. KURSMAN ET AL   3,521,225

UNDERWATER TRANSDUCER AND MOUNTING BRACKET ASSEMBLY

Filed June 25, 1966

INVENTORS
JEROME I. KURSMAN
TEDDY L. HANSFORD

BY *Pario, Haskell & Levine*

ATTORNEYS

United States Patent Office 3,521,225
Patented July 21, 1970

3,521,225
UNDERWATER TRANSDUCER AND MOUNTING BRACKET ASSEMBLY
Jerome I. Kursman, Merion Station, and Teddy L. Hansford, Philadelphia, Pa., assignors to Jetronic Industries, Inc., Philadelphia, Pa., a corporation of Pennsylvania
Filed June 25, 1968, Ser. No. 739,670
Int. Cl. H04r 1/44; A47f 5/10
U.S. Cl. 340—8                                    9 Claims

ABSTRACT OF THE DISCLOSURE

An underwater transducer and mounting bracket assembly is disclosed, for mounting the transducer on the transom of a boat hull. A relationship of bracket and transducer is provided that permits various angle orientations between the transducer and bracket as required for different hull designs, while effectively maintaining a seal between these parts to prevent water from being forced upwardly therebetween in any significant quantity.

---

The present invention relates to the mounting of underwater depth sounder transducers on boat hulls, and more particularly to a bracket and transducer housing assembly for this purpose.

In the small craft and pleasure boat field, it is now quite common to equip the craft with an electronic depth sounder. The depth sounder per se comprises an underwater transducer electrically connected to an electronic circuit structure adapted to inform the operator of the craft of the depth of the water in which he is navigating. This equipment usually is of the sonar type. The circuit structure generates regularly recurring electronic pulses which are applied to the transducer; and the transducer in turn converts these electrical pulses into sonic energy pulses. The sonic energy pulses are radiated to the ground below the craft, and are then reflected back to the transducer where they are reconverted to electrical pulses and coupled to the circuit structure. By one means or another, well known in the art, the circuit structure derives the time interval between the original pulse and the echo pulse and provides a measure of that interval. The indicator associated with the electronic structure is calibrated to display that time interval in terms of the water depth, thereby giving the operator an instantaneous and continuous reading of the depth of the water in which the craft is operating.

The transducer must be positioned under water for the depth sounder to function properly. Therefore, the conventional expedient is to affix the transducer to the hull of the craft. Generally, this is done through the bottom of the hull. However, this is a laborious task, requiring a fair degree of skill, and the removal of the hull from the water. Also, there is always a reluctance on the part of an owner to drill a hole in the bottom of a boat hull. The present invention is intended to permit the mounting of the transducer on the transom of the boat hull, by means of a bracket which can be affixed to the exterior of the transom without drilling any holes through the hull.

It is accordingly one object of the present invention to provide a mounting for an underwater depth sounder transducer.

Another object of the invention is to provide such a mounting to be applied to the hull of a boat, without requiring the drilling of any holes through the hull.

And still another object of the invention is to provide such a mounting for application to the transom of a boat hull.

Other objects and advantages of the present invention will become apparent to those skilled in the art from a consideration of the following detailed description of one exemplary embodiment of the invention, had in conjunction with the accompanying drawings in which like reference characters refer to like or corresponding parts, and wherein.

Figure 1:
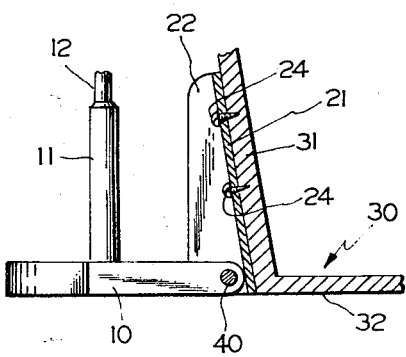
FIG. 1 is a vertical sectional view of a device embodying the present invention, and mounted on the transom of a boat hull.
Figure 2:
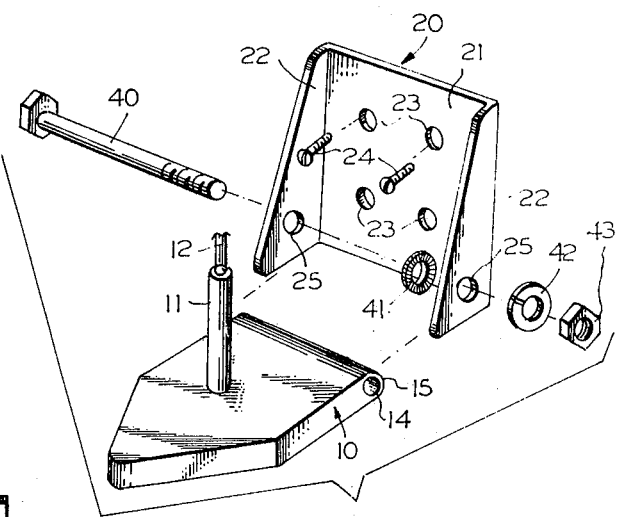
FIG. 2 is an exploded perspective view of the device shown in FIG. 1.

As stated above, the present invention is directed to the mounting of an underwater transducer for interconverting electrical and sonic energy. The transducer per se may be formed of a suitable crystal or like device, as is well known in the art, such as barium titanate. The crystal is conventionally contained or mounted in a housing, and that housing is designated in the drawings by the numeral 10. A stem 11 projecting from the housing 10 supports an electrical connection of the conductor 12 to the transducer crystal within the housing, and the free end of the conductor is terminated in a conventional coaxial connector 13 for coupling to the electrical circuits of the depth sounder, not shown. The stem 11 is conventionally provided, for mounting the housing 10 through a hole in the bottom of the hull; so for the purposes of the present invention the stem 11 could be eliminated, but is retained to permit the bottom mounting when and if desired.

The transducer housing 10 is associated with a mounting bracket 20, comprising a face plate 21 and two vertical side plates or ears 22. A plurality of mounting holes 23 are formed in the bracket face plate 21 to facilitate the mounting of the bracket 20 on the transom 31 of a boat hull 30 by means of suitable wood screws 24, as generally indicated in FIG. 1.

Figure 4:
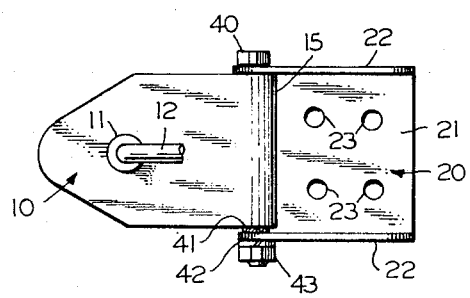
FIG. 4 is a top plan view of the device in the orientation shown in FIG. 3.

The transducer housing 10 is mounted on the bracket 20 by means of a bolt 40. The housing 10 is positioned between the ears 22 of the bracket so that the hole 14 in the forward or leading end of the transducer is axially aligned with the holes 25 in said ears. The bolt 40 is fed through these aligned holes to assemble the transducer housing to the bracket. In addition, a toothed or knurled washer 41, a split lock washer 42, and a nut 43 are also carried by the bolt 40. In assembled condition, the knurled washer is located between a side face of the transducer housing and an adjacent inside face of a bracket ear 22, the nut 43 is threaded on the end of the bolt, and the split lock washer 42 is located between the nut and an outside face of an ear 22, all as shown in FIG. 4. Thus, when the nut is tightened on the bolt, the knurled washer 41 provides a bite between the transducer housing 10 and the bracket ear 22, to prevent relative rotation therebetween on the bolt, and the lock washer prevents loosening of the nut and bolt assembly.

The optimum operational orientation of the transducer housing 10 is with its bottom surface level and parallel with the bottom 32 of the hull 30. Therefore, with the transducer housing and bracket preassembled, and the nut and bolt assembly loose, the bracket is positioned on the transom 31 to effect the stated alignment between the transducer housing and the hull bottom, and screws 24 are driven into the transom through holes 23 to affix the bracket. The transducer housing is then aligned with the boat hull bottom, and the nut and bolt are tightened.

When this kind of an underwater extension is provided from the stern of a boat, rapid progress of the boat through the water tends to drive a stream of water through the space between the leading edge of the transducer housing and the adjacent face plate 21 of the bracket, with a force that causes the water to shoot up in a spray known as a "rooster tail." A significant feature of the present invention is to avoid the "rooster tail" effect. This result is accomplished by a particular construction and relation of parts, involving the leading edge of the transducer housing, and the location of the hole 14 adjacent said leading edge of the transducer housing along with the location of the transducer mounting holes 25 in the side faces or ears of the bracket. The leading edge 15 of the transducer housing is shaped as an arc having its center of curvature at the axial center of hole 14. In addition, the radius of this curvature is substantially equal to the perpendicular distance from the centers of both holes 25 in the two ears 22 to the surface of face plate 21 in bracket 20. In this way, leading edge 15 of the transducer housing 10 is brought into contact with the surface of face plate 21 in bracket 20 when the transducer housing and bracket are assembled, thereby substantially eliminating any gap therebetween and effectively preventing any "rooster tail" spray.

Figure 3:
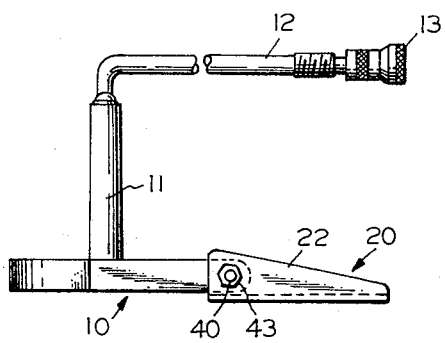
FIG. 3 is a side elevation view of said device.

The angle between the transom 31 and the bottom or keel line 32 is different for different boat hulls. Therefore, when the transducer housing 10 is aligned with the bottom of a given hull, the angle between the housing 10 and face plate 21 of the bracket 20 varies depending upon the particular hull design. However, because the arc of the leading edge curvature 15 is located about the axis of hole 14 as a center, and because the holes 25 in ears 22 are spaced from the surface of face plate 21 by a distance equal to that radius of curvature, contact between edge 15 and face plate 21 is maintained for all practical angles between the transducer housing 10 and the bracket 20. This fact is readily observed from a comparison of the orientations shown in FIGS. 1 and 3.

The foregoing specific embodiment is presented merely as exemplary of the invention, and various modifications will be apparent to those skilled in the art. Accordingly, such variations and modifications as are embraced by the spirit and scope of the appended claims are contemplated as being within the purview of the present invention.

What is claimed is:

1. An underwater transducer and bracket assembly, for mounting the transducer on the transom of a boat hull, comprising a transducer housing having a leading edge and having a transverse hole therethrough adjacent to said leading edge, a bracket having a face plate adapted to be secured to a transom and two side plates projecting therefrom, each side plate having a hole therethrough, and assembly means passing through said side plate holes and said transducer housing hole for joining said housing body and bracket with an adjustable angular relation therebetween, said leading edge being substantially arcuate about the axis of said housing hole as a center, and the perpendicular spacing of the centers of said side plate holes from said face plate being substantially equal to the radius of curvature of said leading edge.

2. An underwater transducer and bracket assembly as set forth in claim 1, wherein the axis of said hole through said housing is substantially parallel with said leading edge.

3. An underwater transducer and bracket assembly as set forth in claim 1, wherein said assembly means comprises a bolt.

4. An underwater transducer and bracket assembly as set forth in claim 3, and further including means for locking said transducer body and bracket in adjusted angular relation.

5. An underwater transducer and bracket assembly as set forth in claim 4, wherein the axis of said hole through said housing is substantially parallel with said leading edge.

6. In combination, a boat hull having a transom, a bracket having a face plate overlying said transom and secured thereto and having two side plates projecting therefrom, each side plate having a hole therethrough, a transducer housing having a leading edge and having a transverse hole therethrough adjacent to said leading edge, assembly means passing through said side plate holes and said transducer housing hole joining said housing body and bracket with an adjustable angular relation therebetween, and means for locking said housing and bracket in adjusted position, said housing being adjusted to an angular position to project from said transom along a line substantially parallel with the bottom of said hull, said leading edge being substantially arcuate about the axis of said housing hole as a center, and the perpendicular spacing of the centers of said side plate holes from said face plate being substantially equal to the radius of curvature of said leading edge.

7. In the combination as set forth in claim 6, the axis of said hole through said housing being substantially parallel with said leading edge.

8. In the combination as set forth in claim 6, said assembly means comprising a bolt.

9. In the combination as set forth in claim 8, the axis of said hole through said housing being substantially parallel with said leading edge.

References Cited

UNITED STATES PATENTS

| | | | |
|---|---|---|---|
| 1,532,087 | 3/1925 | Smith | 248—291 X |
| 2,561,225 | 7/1951 | Powell | 248—291 X |
| 2,874,613 | 2/1959 | Bogar | 248—291 X |
| 2,881,408 | 4/1959 | Dudley. | |
| 2,889,796 | 6/1959 | Williams et al. | |
| 3,004,178 | 10/1961 | Efromson et al. | 340—8 X |
| 3,014,198 | 12/1961 | Harris | 340—8 X |
| 3,082,623 | 3/1963 | Bosland | 248—291 X |

RODNEY D. BENNETT, JR., Primary Examiner

B. L. RIBANDO, Assistant Examiner

U.S. Cl. X.R.

248—291